(12) United States Patent
Adams

(10) Patent No.: US 6,486,640 B2
(45) Date of Patent: Nov. 26, 2002

(54) CONTROL SYSTEM FOR VARIABLE FREQUENCY GENERATOR

(75) Inventor: Christopher John Adams, Bedford (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 09/790,224

(22) Filed: Feb. 21, 2001

(65) Prior Publication Data
US 2001/0022511 A1 Sep. 20, 2001

(30) Foreign Application Priority Data
Feb. 22, 2000 (GB) .............................. 0004018

(51) Int. Cl.[7] .............................. H02H 7/06; H02P 9/00; H02P 11/00; H02P 9/10; H02P 19/14
(52) U.S. Cl. .............................. 322/59; 322/28; 322/29; 322/22; 322/63
(58) Field of Search .............................. 322/58, 71, 63, 322/10, 25, 28; 290/38 R, 46

(56) References Cited

U.S. PATENT DOCUMENTS

| | | | | |
|---|---|---|---|---|
| 4,152,636 A | * | 5/1979 | Gorden | 322/25 |
| 4,179,729 A | * | 12/1979 | Stanton et al. | 318/150 |
| 4,336,486 A | * | 6/1982 | Gorden et al. | 322/63 |
| 5,231,344 A | * | 7/1993 | Marumoto et al. | 322/14 |
| 5,363,032 A | * | 11/1994 | Hanson et al. | 318/701 |
| 5,493,200 A | * | 2/1996 | Rozman et al. | 322/10 |
| 5,495,163 A | * | 2/1996 | Rozman et al. | 322/10 |
| 5,541,456 A | * | 7/1996 | Maggioni et al. | 307/10.1 |
| 5,753,989 A | * | 5/1998 | Syverson et al. | 310/114 |
| 5,850,138 A | * | 12/1998 | Adams et al. | 322/68 |
| 5,920,162 A | * | 7/1999 | Hanson et al. | 290/14 |

* cited by examiner

Primary Examiner—Nestor Ramirez
Assistant Examiner—Julio C. Gonzalez
(74) Attorney, Agent, or Firm—Cantor Colburn LLP

(57) ABSTRACT

Disclosed is a control system for a variable frequency generator including a main stator winding for providing a generator output, excited by a main rotor winding, and a main exciter rotor winding for energizing the main rotor winding, excited by a main exciter field winding. The control system includes: a plurality of inputs adapted to receive respective signals corresponding to respective generator operating parameters; an output adapted to drive the main exciter field winding; and a plurality of negative feedback loops between the output and the inputs. Each loop includes a respective stability compensation network operable to process a feedback signal corresponding to one of the generator operating parameters.

16 Claims, 4 Drawing Sheets

CONTROL SYSTEM FOR VARIABLE FREQUENCY GENERATOR

The present invention relates to a control system for a variable frequency generator. Such a system may be used with an aircraft generator driven, for example, by a gas turbine engine.

TECHNICAL FIELD OF THE INVENTION

A known type of generator for use with an aero-engine is disclosed in GB 1 596 291. The generator comprises three stages, each of which has a rotor and a stator with the rotors being attached to a common drive shaft. The first stage or pilot exciter comprises a permanent magnet generator having a permanent magnet rotor co-operating with three phase stator windings. The stator windings are connected via a rectifier and voltage regulator to the main exciter winding forming the stator of the main exciter. The rotor of the main exciter comprises three phase windings which are connected via a rectifier to a rotor winding of the main generator stage, which has three phase stator windings connected to the generator output. This arrangement is also applicable to variable frequency machines and DC output machines where the main generator stator winding is connected via a rectifier to give a DC generator output.

DESCRIPTION OF THE RELATED ART

The output voltage of the generator is regulated by comparing the output voltage with a reference and controlling the voltage regulator in order to control the main exciter field. The generator must be designed to maintain the nominal output voltage for the full electrical load throughout the operating speed range which may typically be 380 to 780 Hz.

A particular problem experienced in the operation of generators of the above-mentioned type driven at variable speed, is the maintenance of stability of control systems which are provided to facilitate maintaining the transient and steady state voltages within permissible levels as the load and the drive speed varies. A known control system of this type has been used to regulate generator operating parameters relating to average generator output voltage, high phase take-over and generator output current. Signals corresponding to each of these parameters are passed through a highest wins circuit, and the winning signal is subject to stability compensation. Stability compensation is provided by a negative feedback signal from the output of the main exciter field drive, the signal being fed back through a stability compensation circuit.

SUMMARY OF THE INVENTION

In accordance with the invention, there is provided a control system for a variable frequency generator of the type comprising a main stator winding for providing a generator output, excited by a main rotor winding, and a main exciter rotor winding for energising the main rotor winding, excited by a main exciter field winding, the control system comprising: a plurality of inputs adapted to receive respective signals corresponding to respective generator operating parameters; an output adapted to drive the main exciter field winding and a plurality of negative feedback loops between the control system output and the inputs, each loop including a respective stability compensation network operable to process a feedback signal corresponding to one of said operating parameters. This facilitates appropriate tailoring of the stability compensation network characteristics to process each type of signal in an optimal manner.

An operating characteristic of at least one of the stability compensation networks may be adaptively controllable in accordance with a present operating frequency of the generator.

Conveniently, the or each of the adaptively controllable networks may be adaptively controllable in accordance with a predetermined frequency range in which the present operating frequency falls.

The control system may include sensing means operable to sense a plurality of generator operating parameters and to provide to the respective inputs respective signals corresponding to the operating parameters.

The sensing means may be operable to provide signals representing average generator output voltage and/or high phase take-over and/or generator output current.

At least one of the networks may include a switch operable by a frequency dependent input signal. The arrangement may be such that, in use, one of said signals corresponding to a generator operating parameter is directed along a first route through the network until the switch is operated so as to cause the signal to be redirected along a different route through the network. In this manner, the signal corresponding to a generator operating parameter can be caused to pass through a selected arrangement of network components appropriate for providing a desired level of stability compensation in accordance with the present operating frequency. Improved stability control is thereby facilitated across a range of operating frequencies.

The, or each switch may be arranged to operate at a respective predetermined operating frequency.

Each said network may be provided with a respective said switch, the switches being arranged to operate at a common predetermined operating frequency.

The control system may be operable to provide signals respectively corresponding to the average voltage of each phase of the generator output and to provide to one of said control system inputs a high phase take-over signal corresponding to the highest of the sensed average voltages. This is advantageous over the use of a peak voltage sensing circuit for HPT regulation, as described for example in GB-A-2293704, since the discharge rate of a peak sensing circuit can give different values of ripple on the sensed voltage at different frequencies causing changing levels of regulated voltage as the load increases. Also, variations in the peak to RMS ratio of the generator output waveform can occur over the full load and power factor range in a variable frequency control system, and the regulation level is required to remain constant under different operating conditions. Regulators operating on peak sensing give varying RMS levels of regulation as the ratio varies.

In accordance with another aspect of the invention, a control system for a variable frequency generator of the type comprising a main stator winding for providing a generator output, excited by a main rotor winding, and a main exciter rotor winding for energising the main rotor winding, excited by a main exciter field winding, the control system comprising an input adapted to receive a signal corresponding to a generator operating parameter; an output adapted to drive the main exciter field winding and a negative feedback loop between the control system output and the input, the loop including a stability compensation network operable to process the signal, an operating characteristic of the stability compensation network being adaptively controllable in accordance with a present operating frequency of the generator.

BRIEF DESCRIPTION OF THE DRAWINGS

In order that the invention may be better understood, an embodiment thereof will now be described, by way of example only, with reference to the accompanying drawings, in which.

DETAILED DESCRIPTION OF THE PREFERRED EMBODIMENT

Figure 1:
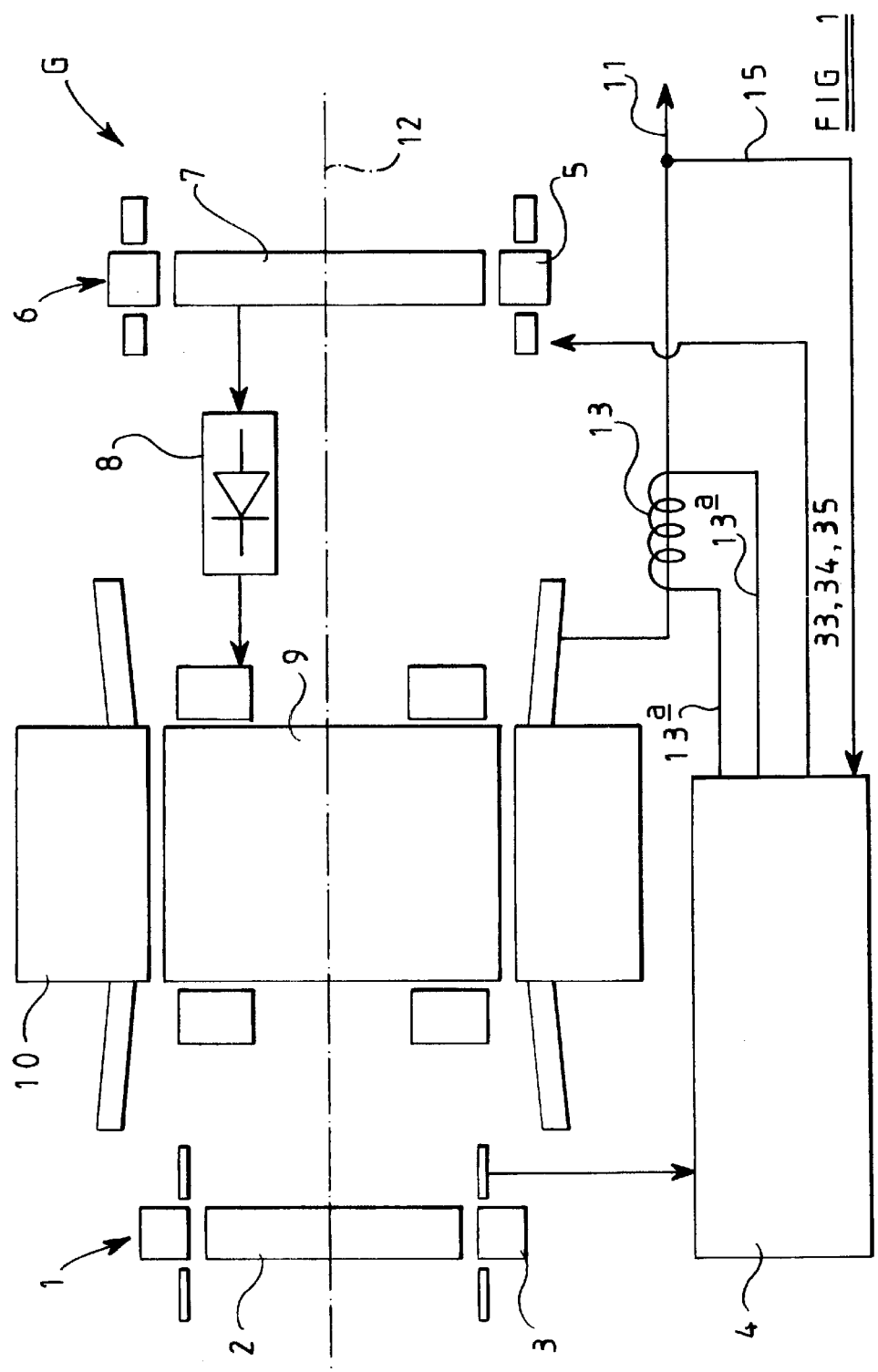
FIG. 1 is a diagram of a generator and generator control unit.

The aircraft variable frequency electrical generator G shown in FIG. 1 comprises a pilot exciter 1 in the form of a permanent magnet generator (PMG) having a permanent magnet rotor 2 and a three phase stator winding 3. The stator winding 3 is connected to a generator control unit 4. The unit 4 supplies power from the winding 3 to a stator field winding 5 of a main exciter 6. The main exciter 6 has a three phase rotor winding 7 connected via a half wave bridge rectifier 8 to a rotor winding 9 of a main rotor of the generator. A main stator 10 has a three phase winding which is connected as the output 11. The main rotor winding 9 together with the rotor winding 7 and the permanent magnet rotor 2 are fixed to a common shaft 12 so as to rotate together. The shaft 12 is connected via a suitable coupling to an aircraft engine.

The control unit 4 is connected to a generator current transformer 13. The transformer 13 senses the current at the output of the generator main stator winding so as to signal along lines 13a to the control unit 4 the output current of the generator and possible fault conditions. The control unit 4 has an input connected to the output 11 by a line 15 for sensing the output voltage of the generator.

Figure 2:
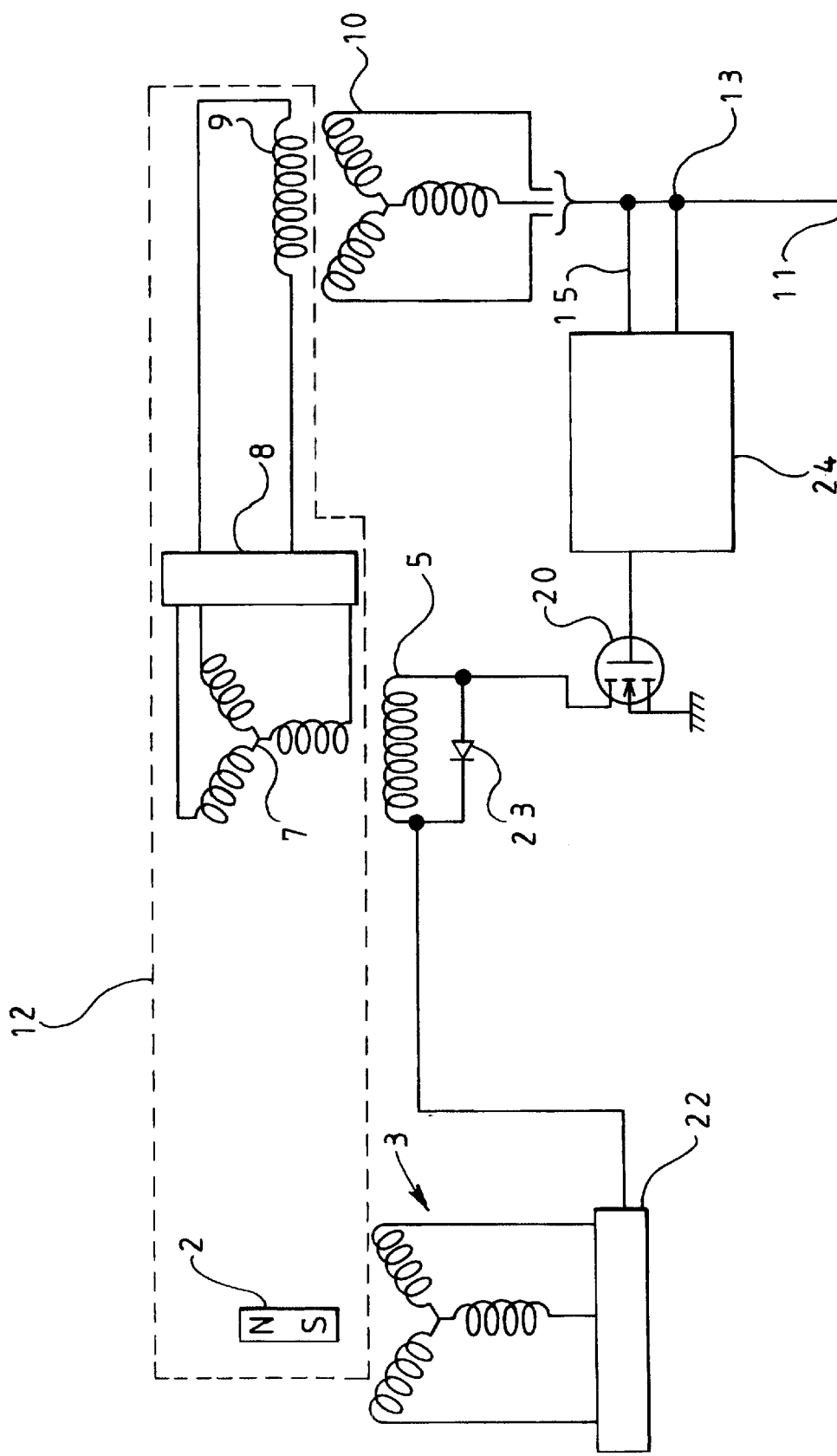
FIG. 2 is a block circuit diagram showing the generator and part of the generator control unit of FIG. 1 in more detail.

The control unit 4 is shown in more detail in FIG. 2. The main exciter field winding 5 is connected in series with an insulated gate power field effect transistor 20 between a common line and the output of a rectifier 22 whose input is connected to the stator winding 3 of the pilot exciter 1. The main exciter field winding 5 is connected in parallel with a diode 23.

The gate of the transistor 20 is connected to the output of a voltage regulator 24 of the generator control unit 4 for driving the main exciter field winding 5. Sensing means, in the form of the transformer 13 and the sensing line 15, is connected to inputs of the voltage regulator 24. The regulator 24 may comprise a control circuit implemented as an application specific integrated circuit.

Figure 3:
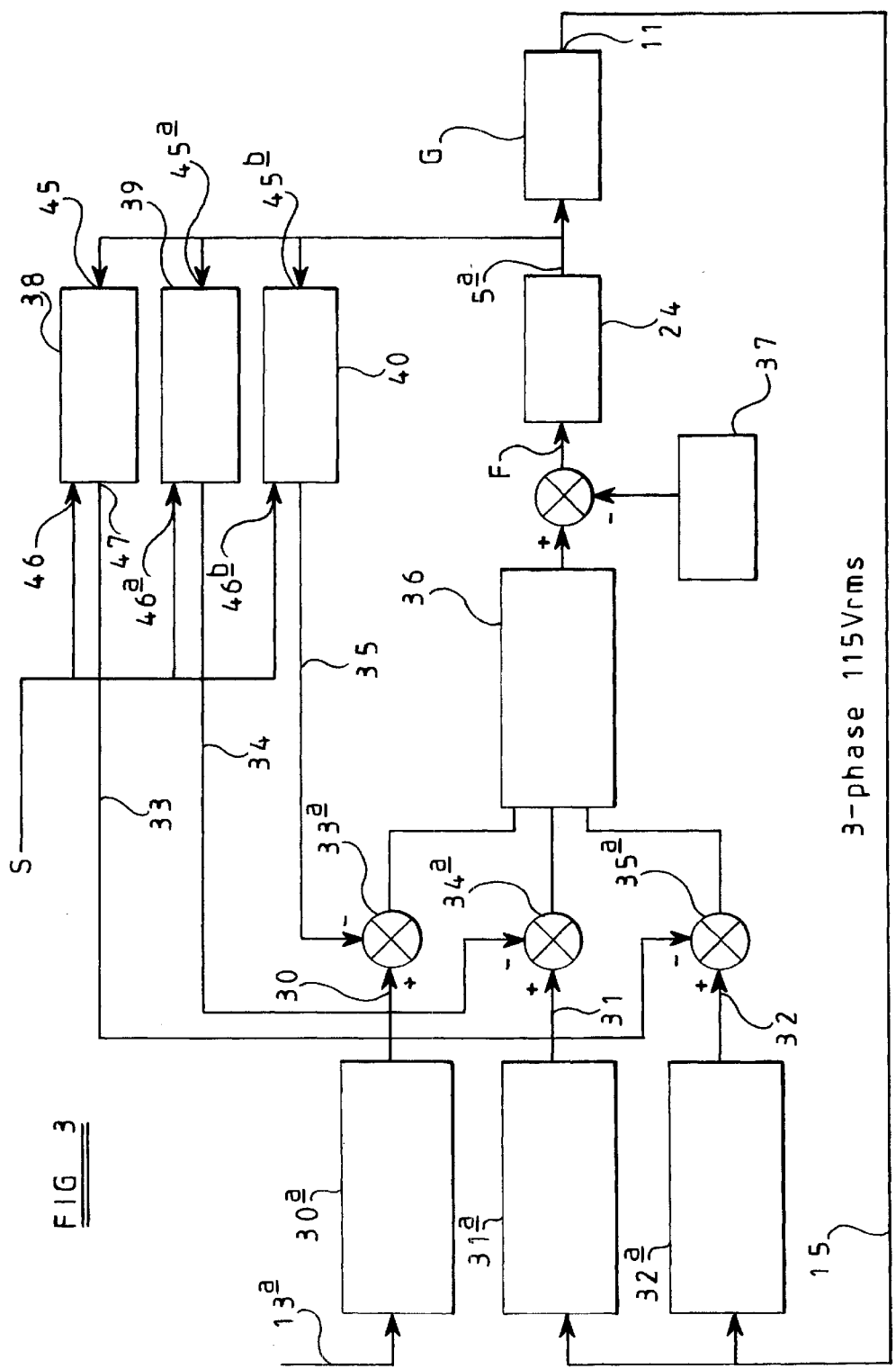
FIG. 3 is a block diagram of a control system for a regulator of the generator control unit, the control system constituting an embodiment of the invention.

FIG. 3 shows a control system for use in the generator control unit voltage regulator 24. Three system inputs 30, 31, 32 are shown respectively corresponding to the operating parameters: generator output current, average generator output voltage and high phase take-over. Signals corresponding to these operating parameters are provided using current and voltage signals drawn by way of the sensing means S from the output 11 of the main stator 10 to the inputs 30, 31, 32 using the lines 13a, 15. The raw signals may be processed by processing means 30a, 31a, 32a to provide signals in convenient form representing a predetermined generator current limit, average voltage and high phase takeover. Negative feedback signals are provided from the output 5a of the main exciter field drive provided by the voltage regulator 24 along respective lines 33, 34, 35 to interact with the input signals 30, 31, 32 at respective summing junctions 33a, 34a and 35a, thus applying negative feedback to each of the three signals routed into a highest wins circuit 36. The highest of the resultant signals prevails and is compared with a reference voltage provided by voltage reference means 37. The input signal F to the field drive is dependent on the relative difference between the output of the highest wins circuit and the reference voltage. In this manner, the main exciter field can be controlled to thereby control the generator output.

The feedback signal from the field drive is directed through independent stability compensation networks 38, 39, 40. Each network is adapted to provide a desired level of compensation specifically tailored to meet the feedback requirements for the particular feedback signal which it is designed to process. This enables the stability of the control system to be enhanced, which is particularly beneficial in high variable frequency systems where there can be considerable change in the generator transfer function over the frequency and load range.

Each network 38, 39 40 has a respective input 45, 45a, 45b connected to the field drive output 5a and a respective input 46, 46a, 46b connected to a frequency dependent signal source S controlled by the control system.

Figure 4:
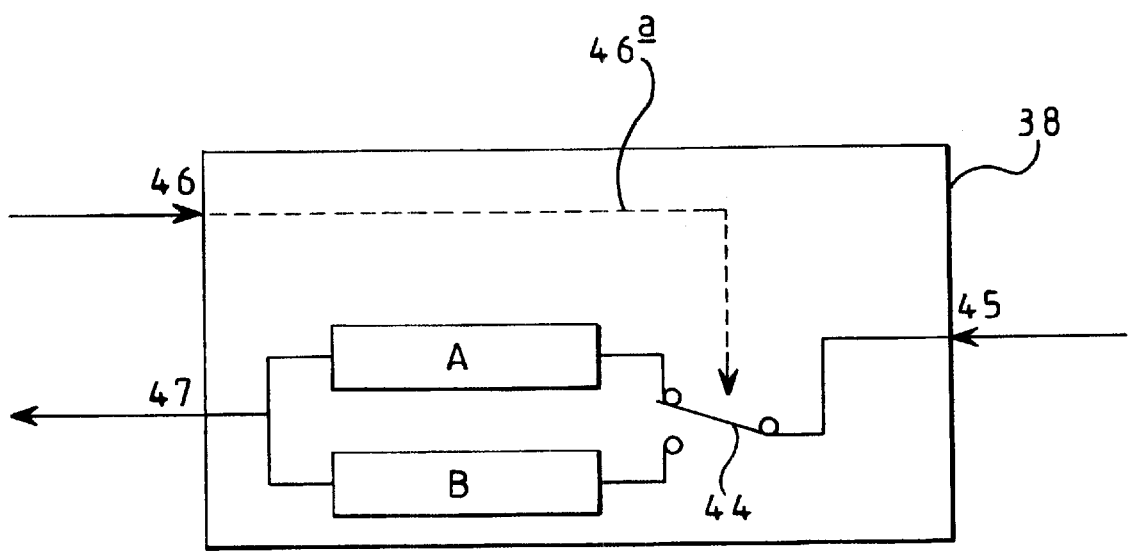
FIG. 4 is a schematic diagram of a stability compensation block of the control system.

FIG. 4 is a schematic diagram of the stability compensation block for processing a feedback signal for the high phase take-over. The stability compensation network 38 includes two stability compensation sub-networks A and B. An input 45 of the stability compensation network 38 is connected in series with sub-network A or alternatively sub-network B by a switch 44, for example a solid state switch or changeover relay. The switch 44 is operable by a signal from an input 46 of the network 38 as indicated by broken line 46d.

A feedback signal from input 45 is directed through sub-network A to an output 47 of the network 38 until the switch is operated by a signal from input 46 so as to route the feedback signal through sub-network B to output 47. The signal for operating the switch 44 is input to input 46 when the operating frequency of the generator reaches a predetermined frequency. In the exemplary embodiment, the generator is designed to operate from 380–780 Hz and means are provided for supplying a frequency dependent input signal for switching switch 44 from sub-network A to sub-network B when the generator speed reaches 580 Hz. This typically changes the feedback time constant by a factor of 3.

In a practical arrangement, the switch is operable to redirect the feedback signal from a route passing through a first resistor to a route passing through the first resistor in parallel with a second resistor. The frequency dependent input signal may be an adaptive gain signal from the microprocessor, the microprocessor being programmed to detect the generator frequency.

Clearly, several different sub-networks may be arranged to be connected into the feedback loop at various respective operating frequencies if required. It will be appreciated that similar switches and sub-networks C/D, E/F can be provided in the networks 39 and 40. Such additional switches and sub-networks can be arranged to provide different levels of stability compensation and/or different switching frequencies depending on the feedback requirements of the loop 33, 34, 35 in which they are incorporated.

What I claim is:

1. A control system for a variable frequency generator comprising a main stator winding for providing a generator output, the main stator winding being excited by a main rotor winding, and a main exciter rotor winding for energising the main rotor winding, the main exciter rotor winding being excited by a main exciter field winding, the control system comprising:

sensing means for receiving the generator output to sense operating parameters of the generator and for providing signals respectively representing an average generator output voltage, a high phase take-over signal corresponding to the highest one of sensed average voltages of the phases of the generator output, and a generator output current signal;

a plurality of inputs adapted to receive the signals from the sensing means;

an output adapted to drive the main exciter field winding; and a plurality of negative feedback loops between the output and the plurality of inputs;

each loop including a respective stability compensation network operable to process a feedback signal corresponding to one of the operating parameters.

2. A control system as claimed in claim 1, wherein an operating characteristic of at least one of the stability compensation networks is adaptively controllable in accordance with a present operating frequency of the generator.

3. A control system as claimed in claim 2, wherein each of the adaptively controllable networks is adaptively controllable in accordance with a predetermined frequency range in which the present operating frequency falls.

4. A control system as claimed in claim 1, wherein the stability compensation network includes a switch operable by a control signal dependent on an operating frequency of the generator, wherein the switch has one end connected to an input of the network for receiving an input signal associated with one of the signals provided by the sensing means and the other end selectively connected to one of a plurality of sub-network routes, the input signal being selectively directed to one of the plurality of sub-network routes by the switch in response to the control signal.

5. A control system as claimed in claim 4, wherein the each switch is arranged to operate at a respective predetermined operating frequency.

6. A control system as claimed in claim 4, wherein each of the networks is respectively provided with the switch, the switches being arranged to operate at a common predetermined operating frequency.

7. A control system as claimed in claim 1, wherein the control system is operable to provide signals respectively corresponding to an average voltage of each phase of the generator output and to provide to one of the plurality of inputs a high phase take-over signal corresponding to a highest voltage of sensed average voltages.

8. A control system for a variable frequency generator comprising a main stator winding for providing a generator output, the main stator winding being excited by a main rotor winding, and a main exciter rotor winding for energising the main rotor winding, the main exciter rotor winding being excited by a main exciter field winding, the control system comprising:

an input adapted to receive a signal corresponding to a generator operating parameter;

an output adapted to drive the main exciter field winding; and a negative feedback loop between the output and the input, the loop including a stability compensation network operable to process the signal;

an operating characteristic of the stability compensation network being adaptively controllable in accordance with a present operating frequency of the generator.

9. A control system as claimed in claim 8, wherein the adaptively controllable network is adaptively controllable in accordance with a predetermined frequency range in which the present operating frequency falls.

10. A control system as claimed in claim 8, further comprising sensing means for receiving the generator output to sense the generator operating parameter and to provide to the input a signal corresponding to the operating parameter.

11. A control system as claimed in claim 10, wherein the sensing means is operable to provide a signal representing one of an average generator output voltage, high phase take-over and generator output current.

12. A control system as claimed in claim 8, wherein the stability compensation network includes a switch operable by a control signal dependent on an operating frequency of the generator, wherein the switch has one end connected to an input of the network for receiving an input signal associated with one of the signals provided by the sensing means and the other end selectively connected to one of a plurality of sub-network routes, the input signal being selectively directed to one of the plurality of sub-network routes by the switch in response to the control signal.

13. A control system as claimed in claim 8, wherein the control system is operable to provide signals respectively corresponding to an average voltage of each phase of the generator output and to provide to the input a high phase take-over signal corresponding to a highest voltage of sensed average voltages.

14. A control system as claimed in claim 12, wherein switches each included in corresponding one of the stability compensation networks are arranged to operate at a common predetermined operating frequency.

15. A control system as claimed in claim 8, further comprising sensing means for receiving the generator output to sense operating parameters of the generator and for providing signals respectively representing an average generator output voltage, a high phase take-over signal corresponding to the highest one of sensed average voltages of the phases of the generator output, and a generator output current signal.

16. A control system as claimed in claim 4, wherein the plurality of sub-network routes each include a stability compensation sub-network for maintaining stability of the control system by compensating an input signal of the stability compensation sub-network.

* * * * *